United States Patent [19]

Tschantz

[11] Patent Number: 4,760,913

[45] Date of Patent: Aug. 2, 1988

[54] HINGED BELT SUPPORT AND ENCLOSURE SYSTEM

[75] Inventor: William H. Tschantz, Canton, Ohio

[73] Assignee: Harrison Handling, Inc., Canton, Ohio

[21] Appl. No.: 12,800

[22] Filed: Feb. 9, 1987

[51] Int. Cl.⁴ .......................................... B65G 15/08
[52] U.S. Cl. .................................... 198/819; 198/828; 198/607; 198/826; 198/842
[58] Field of Search ................. 198/819, 827, 828, 607, 198/628, 860.3, 860.5, 861.1, 826, 835, 836, 837, 842

[56] References Cited

U.S. PATENT DOCUMENTS

| | | | |
|---|---|---|---|
| Re. 24,611 | 2/1959 | Stamos | 198/827 |
| 1,366,944 | 2/1921 | Ritchie, Jr. | 198/861.1 X |
| 1,590,883 | 6/1926 | Bryant | |
| 1,946,706 | 2/1934 | Mason | 198/819 |
| 2,199,935 | 5/1940 | Johns | 198/819 |
| 2,365,762 | 12/1944 | Johns et al. | 198/819 X |
| 2,793,738 | 5/1957 | Erickson | 198/860.3 X |
| 2,839,180 | 6/1958 | Ackers | 198/819 |
| 2,862,607 | 12/1958 | Stamos et al. | 198/827 |
| 3,062,360 | 11/1962 | Arndt et al. | 198/828 |
| 3,105,588 | 10/1963 | Long | 198/828 X |
| 3,138,240 | 6/1964 | Michaelson | 198/826 |
| 3,429,422 | 2/1969 | Yoshimura | 198/819 X |
| 3,430,756 | 3/1969 | Allendorf | 198/828 |
| 3,999,646 | 12/1976 | Yoshida | 198/680 |
| 4,094,401 | 6/1978 | Sanderson | 198/827 |
| 4,204,594 | 5/1980 | Banno | 198/827 |
| 4,402,395 | 9/1983 | Hashimoto | 198/807 |
| 4,410,482 | 10/1983 | McGinnis | 198/818 |

FOREIGN PATENT DOCUMENTS

| | | | |
|---|---|---|---|
| 224592 | 4/1959 | Australia | 198/828 |
| 495574 | 1/1978 | Australia | 198/827 |
| 0168339 | 1/1986 | European Pat. Off. | 198/827 |
| 3606129 | 8/1986 | Fed. Rep. of Germany | 198/819 |
| 58-207206 | 12/1983 | Japan | 198/819 |
| 418677 | 10/1934 | United Kingdom | 198/628 |

Primary Examiner—Robert J. Spar
Assistant Examiner—Lyle K. Kimms
Attorney, Agent, or Firm—Michael Sand Co.

[57] ABSTRACT

A support and enclosure system for a hinged belt conveyor includes a frame truss enclosing loaded and unloaded belt flights. The frame truss includes a plurality of vertical risers. The loaded flight rides between a plurality of troughing roll sets and top idler roll sets. The unloaded flight is supported and guided by return idler roll sets. Each of the roll sets is connected distally by a clevis to mounting shafts. The mounting shafts are accepted into mounting brackets. The mounting brackets for the troughing rolls and return idler rolls include a locking bolt for fixing the position of the shafts in the bracket. The bracket for the top idler rolls includes a spring for biasing the top idler mounting shafts outward so as to bias the top idler rolls downward onto the loaded flight. Each mounting bracket incorporates a recess for accepting a first portion of a riser and a pivoting leg for engaging an opposed section of the riser. The arm and leg are biased together by a bolt which clamps the bracket to the riser. The brackets and the roll sets connected thereto are selectively positioned on the riser both vertically and rotatably by loosening the bolt, positioning the bracket, and retightening the bolt. The system also includes an orienting pulley positioned in advance of a head pulley and the tail pulley in the direction of belt travel. The orienting pulley relieves stress and prevents the twisting of the hinged belt as it travels about the head and tail pulley. The frame truss in an alternative embodiment is covered by a cap to protect the belt and its contents from the elements and to better protect to personnel from being caught in the belt.

30 Claims, 16 Drawing Sheets

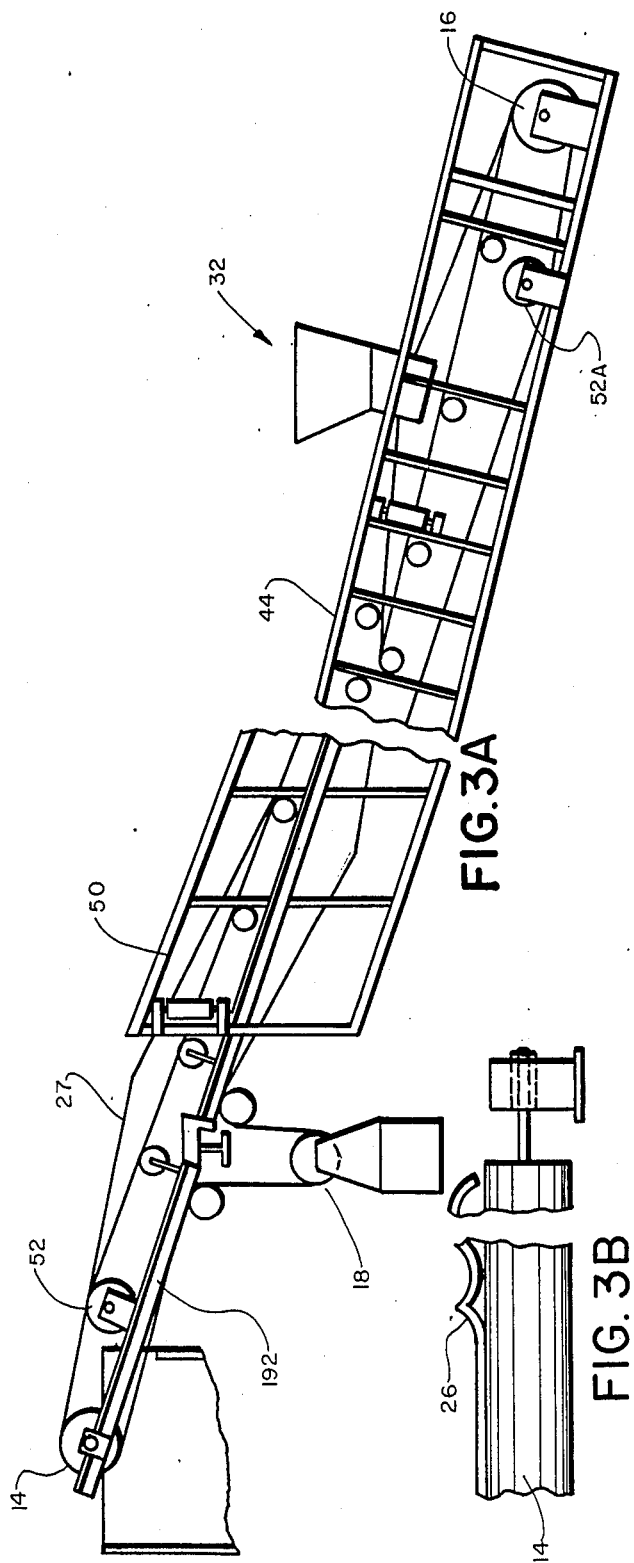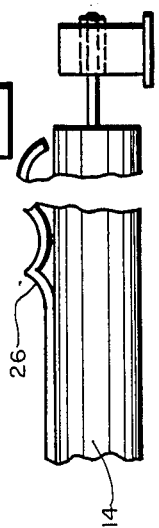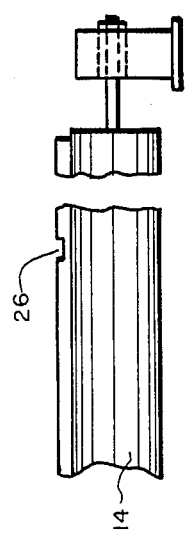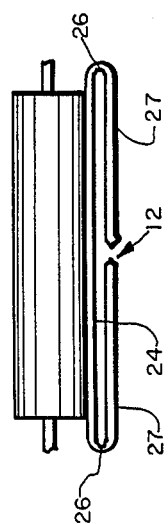

HINGED BELT SUPPORT AND ENCLOSURE SYSTEM

TECHNICAL FIELD

This invention relates to hinged belt systems such as those used to transport bulk materials between different elevations. Particularly, this invention relates to systems used to support and enclose such belt conveyors and to open and close such conveyors for loading and unloading materials.

BACKGROUND ART

Hinged belts are relatively new in the art for carrying bulk materials such as mineral ore and are available commerically from one known supplier, namely, The Goodyear Tire and Rubber Company. Such belts consist of a disc-shaped trough portion and a pair of flaps for covering and enclosing the material in said trough portion. Typically, hinged belts are used to move materials between various elevations. Such belts are suited for this purpose because the flaps in the closed position serve to contain the bulk material and prevent it from flowing inside the belt. Such flowing may otherwise occur due to gravity or inertia when the belt starts or stops. The use of hinged belts enables bulk materials to be transported at inclines or declines in excess of 45° and at speeds up to 1000 feet per minute.

Hinged belts are continuous and extend between a head pulley and a tail pulley. A driving means is used to drive the belt. The belt typically has a loaded flight on which the trough portion faces upward for carrying the material from a loading area near a tail pulley to an unloading area near a head pulley. The belt also has an unloaded flight which extends from the head pulley to the tail pulley on the return run.

The belt is loaded with material in the area near the tail pulley. In order to load material into the belt, the flaps must be open. Once the material is loaded on the belt, the flaps are held closed. As the belt approaches the area near the head pulley, the flaps are permitted to open and the material removed. The loaded belt flight is supported between the tail and head pulleys by a plurality of troughing rolls. The loaded flight rides on these rolls and is guided thereby in the proper direction. Along the loaded flight, in the area of the steepest incline or decline, a plurality of spring loaded top idler rolls are mounted. The top idler rolls press downward on the flaps of the belt and insure that the belt flaps remain closed and that the material stays in a fixed relation on the belt without flowing. Once the belt reaches the area of the head pulley and is unloaded, the belt travels over the head pulley and is directed back toward the tail pulley supported by a plurality of return idler rolls.

In existing systems, the troughing rolls, top idler rolls and return idler rolls are all fixedly mounted on a support framework. In such systems, the supporting framework must be designed in advance so as to provide means for mounting top idlers, troughing rolls, and return idlers in the proper positions. This is often difficult because the supporting framework and rolls must conform to the contour of the terrain over which the belt travels. Because the terrain is not always known, or may be subject to change during mining operations, it is frequently necessary to make adjustments in the mounting of the rolls during installation in the field.

In prior systems, the method known to applicant to be used to facilitate the adjustment of roll positions is to journal the rolls on discrete stands. The stands are then mounted to a flat frame. In order to adjust the roll positions, shims are added to or removed from underneath the stands. This process is tedious and time consuming due to the labor involved in placing shims of the proper thickness under each stand.

Further, in existing systems, there is frequently a need to position various rolls at rake angles to direct the belt to move in a desired direction at a particular location. The need for having a roll at a rake angle and the extent of such angle often cannot be determined until the belt is operational. The need to mount a roll at a rake angle often results in additional work in the field.

It is desirable due to the hinged flap construction to have the belt move along the return flight in the closed position. This also prevents excess material not removed by scrapers at the unload station from dropping off the belt and causing an unsafe and unsightly condition. In these prior systems additional side rolls are required to guide the flaps closed as it travels along the return flight. These additional side rolls and the supporting structure add to the cost of the system.

Existing belt systems are generally exposed to contact by personnel working on or near the belt which is extremely dangerous due to the speed at which the belt is moving.

Thus, there exists a need in the prior art for a support and enclosure system for a hinged belt conveyor which facilitates positioning of the rolls during installation of the system in the field, enables the flaps of the unloaded flight of the belt to be placed in the folded condition without excessive stressing and by the more convenient use of guide rolls, which provides a means for opening and closing the belt flaps to prevent damage to the belts, and which increases the safety of the system.

It has been discovered that a hinged belt when approaching a drive pulley in a closed position if not permitted to open properly will cause premature wear and damage to the belt due to the flaps attempting to bend at areas other than the hinge area resulting in the belt destruction within a relatively short period of time. This problem also exists upon the return flight of the closed empty belt approaching the tail pulley. Thus a need has arisen for an orienting pulley arrangement for use with the hinged belt conveyor system which prevents the belt flaps from attempting to turn or fold back under the support rolls and bending at belt areas other than the hinge areas causing the belt to self destruct.

DISCLOSURE OF THE INVENTION

It is an object of the present invention to provide a support and enclosure system for a hinged belt conveyor which can be easily assembled at a lower cost.

It is a further object of the present invention to provide a support and enclosure system for a hinged belt conveyor that uses a minimum number of specially fabricated parts regardless of the configuration of the system.

It is a further object of the present invention to provide a support and enclosure system for a hinged belt conveyor in which the position of each top idler roll is readily adjustable both vertically and rotatably.

It is a further object of the present invention to provide a support and enclosure system for a hinged belt conveyor in which the position of each troughing roll is readily adjustable both vertically and rotatably.

It is a further object of the present invention to provide a support and enclosure system for a hinged belt conveyor in which the position of each return idler roll is readily adjustable both vertically and rotatably.

It is a further object of the present invention to provide a support and enclosure system for a hinged belt conveyor in which the position of each side roll is readily adjustable both vertically and rotatably.

It is a further object of the present invention to provide a support and enclosure system for a hinged belt conveyor in which the flaps of the hinged belt are maintained in a predetermined closed position as the belt moves around the tail pulley without excessive stressing of certain belt areas.

It is a further object of the present invention to provide a support and enclosure system for a hinged belt conveyor in which the belt and its contents are enclosed within the truss to protect personnel from dangerous accidential contact with the belt.

It is another object of the invention to mount an orienting pulley closely adjacent each of the head and tail pulleys to insure proper opening of the belt and to prevent damage to the belt flaps.

Further objects of the invention are made apparent in the following description for the best mode for carrying out the invention and the appended claims.

The foregoing objects are achieved in the preferred embodiment by enclosing the loaded and unloaded flights of a hinged belt conveyor which extend between a head pulley and a tail pulley, in a box frame truss including vertical risers A plurality of troughing roll sets traverse to the direction of travel of the belt, support the loaded flight. The outboard rolls of the troughing roll sets are connected to troughing roll mounting shafts which extend distally adjacent the risers. The troughing roll mounting shafts are accepted and selectively positionable in troughing roll mounting brackets, said brackets including selectively engagable locking means for selectively locking the troughing roll mounting shafts on said brackets. The troughing roll mounting brackets further include selectively engageable clamping means for clamping said brackets in position on the risers. The troughing roll sets are thereby positionable vertically and rotatably along said risers. The troughing roll sets are further postionable traversely to the direction of belt travel by selectively positioning said troughing roll mounting shafts in said troughing roll mounting brackets.

A plurality of top idler roll sets are positioned above the loaded flight and traverse the direction of belt travel. The outboard top idler rolls of the top idler roll sets are connected to top idler roll mounting shafts extending distally and adjacent said risers The top idler mounting shafts are accepted into top idler roll mounting brackets. The top idler mounting brackets include clamping means similar to the troughing roll mounting brackets enabling the selective positioning of said brackets on the risers. The top idler roll mounting brackets unlike the troughing roll mounting brackets, include biasing means for biasing the top idler roll mounting shafts outward, thus biasing the top idler rolls toward the flaps of the hinged belt.

The unloaded flight extends from the head pulley to the tail pulley underneath the loaded flight and the troughing roll sets. The unloaded flight is supported by a plurality of return idler rolls traverse to the direction of belt travel The return idler rolls are connected to return idler mounting shafts which extend distally of said rolls adjacent said risers The return idler mounting shafts are accepted and selectively positionable in return idler roll mounting brackets. The return idler roll mounting brackets are similar to the troughing roll mounting brackets and include locking means for locking the return idler roll mounting shafts on the brackets. The return idler roll mounting brackets further include selectively engageable clamping means enabling selective positioning of the brackets on the risers In the preferred embodiment of the invention, the troughing roll sets, top idler roll sets and return idler roll sets are readily positionable along the risers which permits the belt flights to be positioned vertically as desired within the frame truss. Further, rake angles can be imparted to the rolls by rotatably positioning said brackets on the risers.

The flaps of the belt are open adjacent the tail and head pulleys for purposes of loading and unloading the material transported on the belt. Preferably in the areas in which the belt is closed a plurality of side rolls are positioned vertically to guide the flaps toward the closed position. The side rolls may also be used to maintain the flaps in a predetermined position when moving to the open position. The side roll mounting shafts are accepted into and positionable in side roll mounting brackets. The side roll mounting brackets are similar to the troughing roll and return idler roll mounting brackets and include means for locking the side roll mounting shafts in position. The side roll mounting brackets further include selectively engageable clamping means for attaching the brackets to the risers in selected positions.

An orienting pulley is mounted for rotation on the frame in advance of the tail and head pulleys. The orienting pulley presses against the belt to bring the flaps to a completely open position before reaching the head pulley and to prevent overlap of the flaps as the belt approaches the tail pulley on the return run to prevent damage to the flaps. The orienting pulley is a flat crownless roll and extends traverse to the direction of the belt travel. The orienting pulley causes the flaps of the unloaded belt flight to be maintained in a predetermined closed position as the belt travels around the tail pulley. The belt and and rolls are located completely within the truss which forms a protective enclosure for the belt to protect personnel from accidental contact with the belt and its contents.

BRIEF DESCRIPTION OF THE DRAWINGS

Preferred embodiments of the invention, illustrative of the best mode in which applicant has contemplated applying the principles, are set forth in the following description and are shown in the drawings and are particularly and distinctly pointed out and set forth in the appended claims.

FIG. 3A is an enlarged fragmentary side view of the conveyor system showing orienting pulleys at the head and tail pulleys thereof;

FIG. 3B is a cross sectional view of a head pulley and hinged belt of a conventional conveyor system during operation without an orienting pulley in advance of the head pulley;

FIG. 3C is a cross sectional view of a head pulley and hinged belt of the conveyor system of the preferred embodiment during operation;

FIG. 3D is a cross sectional view of an orienting roll and hinged belt in advance of a tail pulley on the return run of the belt;

FIG. 3E is an end elevation of the belt passing over the tail pulley after the return run of the belt;

Similar numerals refer to similar parts throughout the drawings.

BEST MODE FOR CARRYING OUT THE INVENTION

Figure 1:
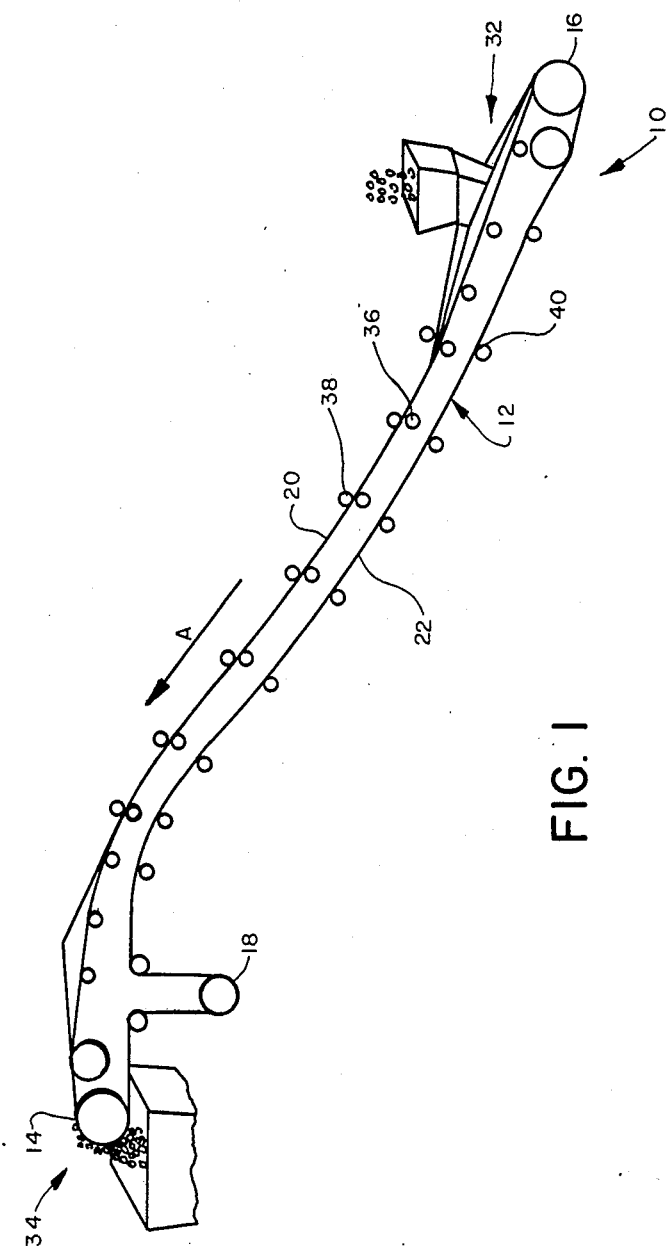
FIG. 1 is a schematic view of a hinged belt conveyor.

Turning now to the drawings, and particularly to FIG. 1, there is shown therein a schematic of a hinged belt conveyor, generally indicated 10. A hinged belt 12 extends between a head pulley 14 and a tail pulley 16. The belt is driven in the direction of arrow A by conventional drive means (not shown). A belt takeup 18 maintains proper tensioning of the belt. The belt includes a loaded flight 20 which carries material and an unloaded flight 22 which is the return flight.

Figure 6A:
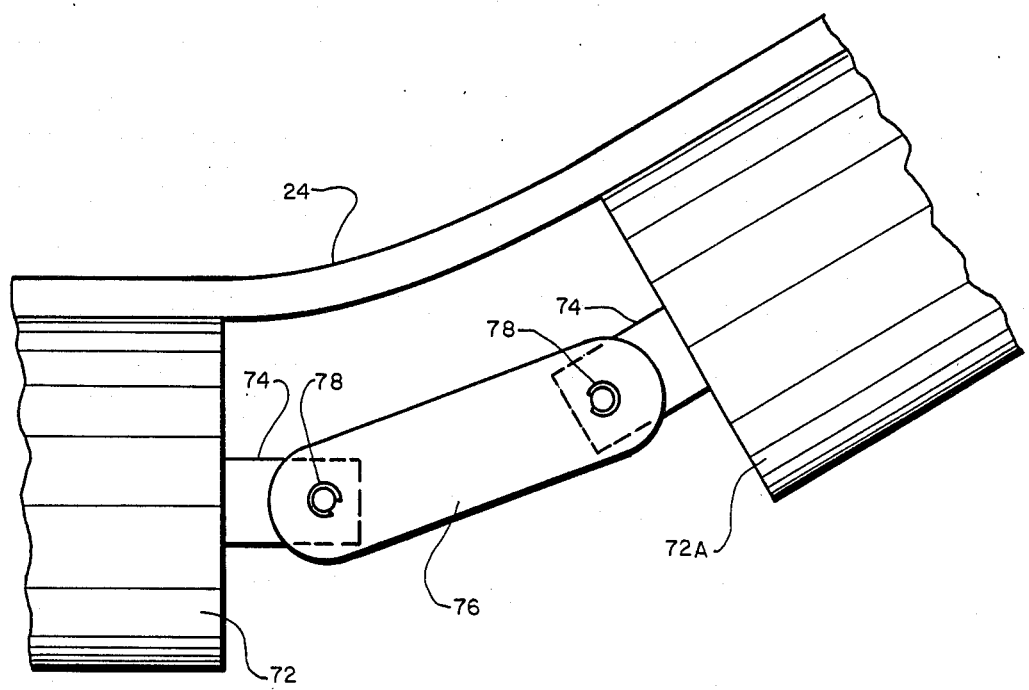
FIG. 6A is a detailed view of the troughing roll connecting assembly of the preferred embodiment of the present invention.
Figure 6:
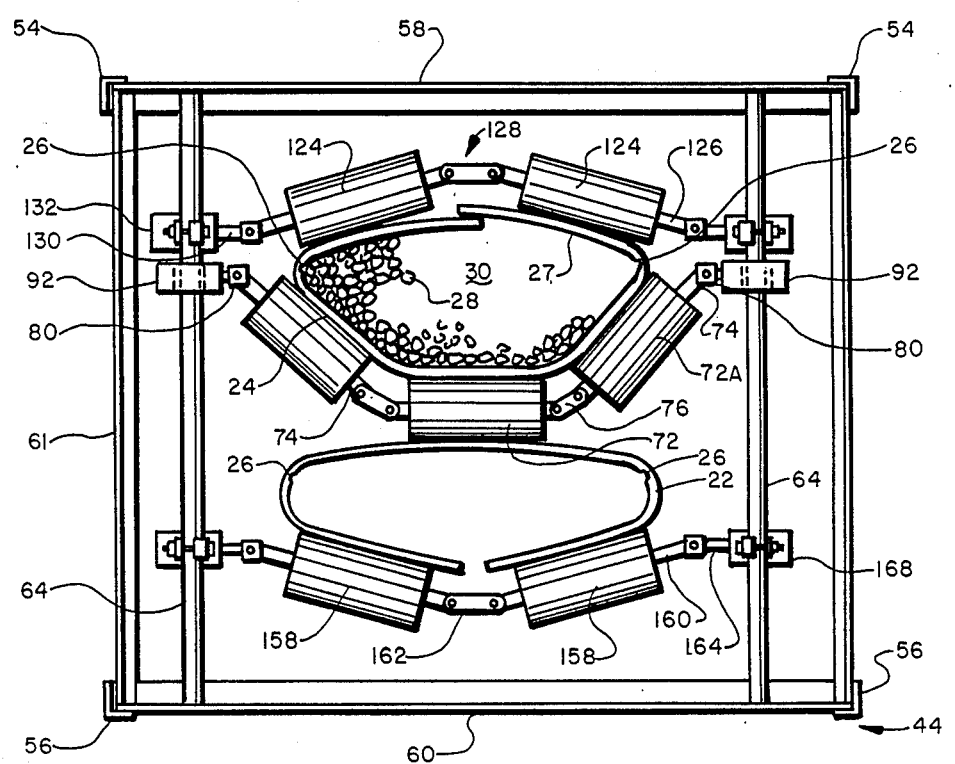
FIG. 6 is a cross sectional view of a frame truss section of the preferred embodiment of the support and enclosure system of the present invention.

As shown in detail in FIG. 6, belt 12 is generally elliptical in section and includes a trough portion 24 and a pair of flaps 27 connected integrally thereto by hinges 26. In the preferred embodiment a pair of symmetrical flaps 27 are used. An internal area of the belt 28 encloses bulk material, generally indicated 30, such as mineral ore, which is carried by the belt.

At a loading station 32, adjacent tail pulley 16, the flaps are opened and the material is deposited into internal area 28. The flaps are closed as the material is moved up an incline until it reaches an unload station 34 near the head pulley where the flaps are again opened and the material is removed.

Loaded flight 20 is supported by a plurality of troughing roll sets 36 which extend traverse across the belt and are in supporting contact with the outside of trough portion 24. Between the load station 32 and the unload station 34 the flaps of the belt are held closed by a plurality of top idler roll sets 38 which extend traversely across the belt. The unloaded flight of the belt is supported and guided back to the tail pulley from the head pulley by a plurality of return idler roll sets 40 shown in detail in FIGS. 6, 17 and 21.

Figure 2:
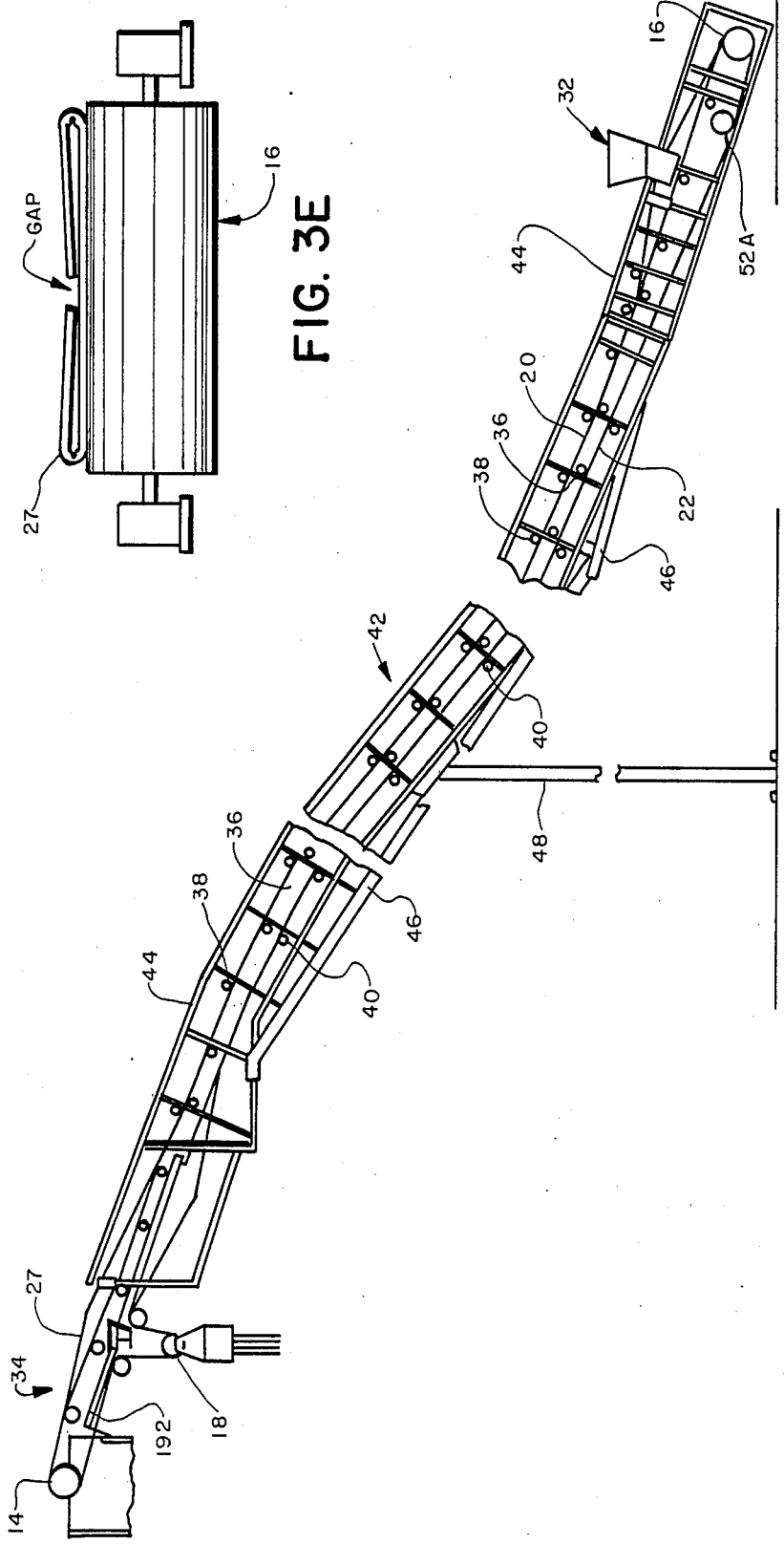
FIG. 2 is a side view of a hinged belt conveyor incorporating the preferred embodiment of the support and enclosure system of the present invention.

In the preferred embodiment of the present invention, the loaded and unloaded flights of the hinged belt conveyor are enclosed within a frame truss indicated generally at 42 as shown schematically in FIG. 2. The frame truss is comprised of sections 44 held together by attaching means (not separately shown). Bracing members 46 hold the frame sections 44 in proper relation. Stanchions 48 are used to support frame truss 42. As shown in FIG. 2, the troughing roll sets 36, top idler roll sets 38 and return idler roll sets 40 are positioned at various heights within the frame truss. This is a fundamental aspect of the present invention as hereinafter explained.

Figure 3:
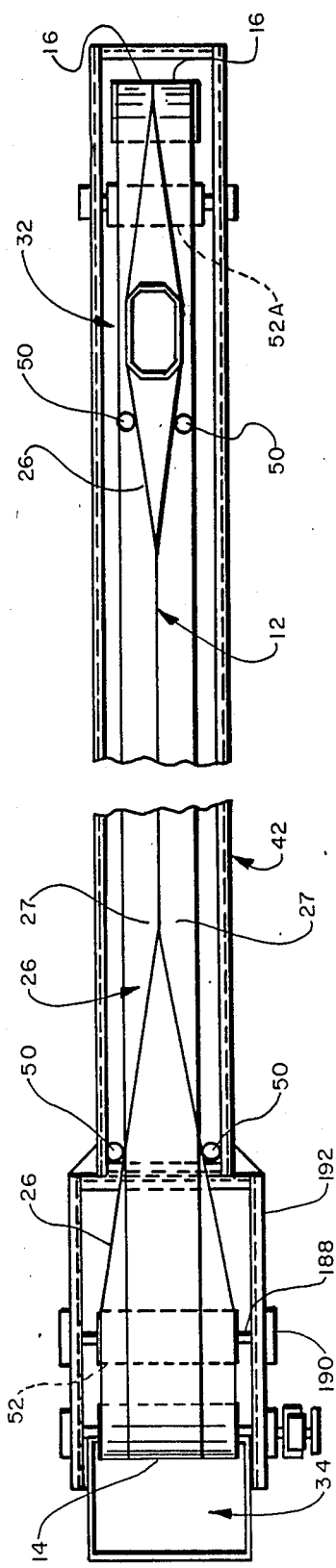
FIG. 3 is a plan view of the preferred embodiment of the support and enclosure system of the present invention.

A sectioned top view of the belt conveyor is shown in FIG. 3. In the areas adjacent loading station 32 and unloading station 34, top idler roll sets are not used. This enables opening the flaps 27 of loaded flight 20. Side rolls are used to control and guide the position of flaps 27 in these areas as the flaps extend upward. In accordance with one of the main features of the invention, a flap orienting roll 52 is positioned under the loaded flight preferably 2 to 4 feet in advance of head pulley 14 although it can be located up to several inches from head pulley 14. A second orienting pulley 52A is located a similar distance with respect to tail pulley 16 (FIG. A), the purpose of which orienting rolls are later explained.

Figure 4:
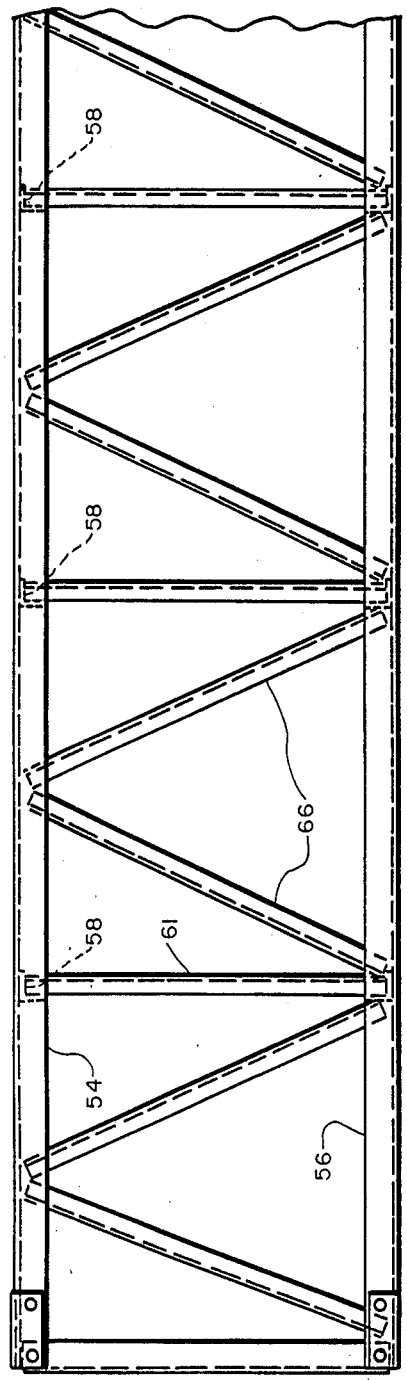
FIG. 4 is a side view of a frame truss section of the support and enclosure system of the present invention.
Figure 5:
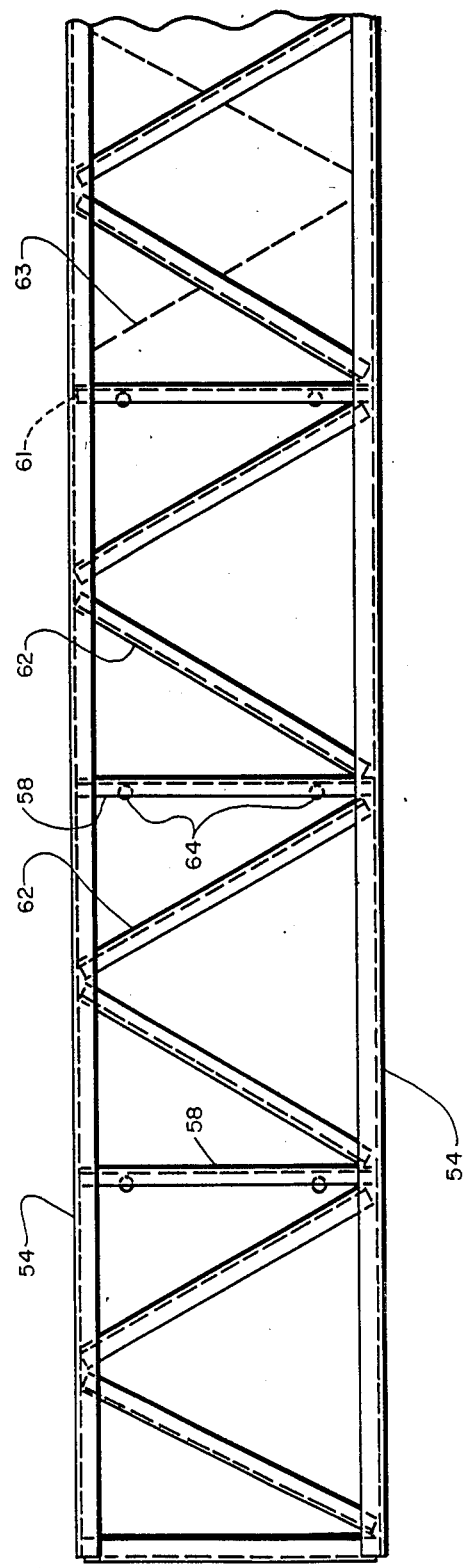
FIG. 5 is a top view of a frame truss section of the support and enclosure system of the present invention.

Each of the frame sections 34 that comprise frame truss 42 are rectangular in cross section and constructed as shown in FIGS. 4-6. The frame truss section 44 includes a pair of top angles 54 and bottom angles 56. Top lateral braces 58 extend between the top angles 54. Bottom lateral braces 60 extend between bottom angles 56. In the preferred embodiment, the bottom lateral braces 60 are positioned below and aligned with top lateral braces 58. Side braces 61 extend vertically between top lateral braces 58 and bottom lateral braces 60. Top diagonal braces 62 extend between the top lateral braces. Bottom diagonal braces 63 (shown in phantom) extend between the bottom diagonal braces in a manner that is similar to the top diagonal braces but at opposite angles.

Figure 4A:
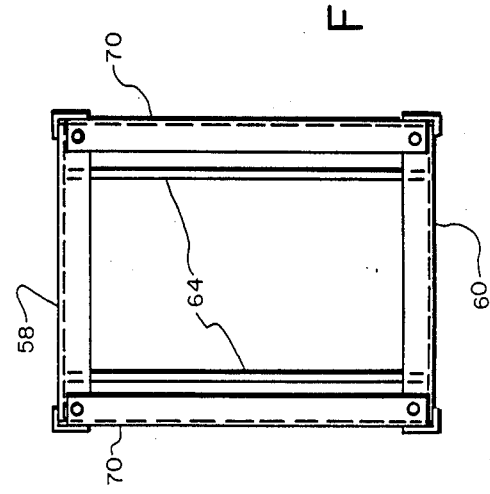
FIG. 4A is an end view of a frame truss section of the support and enclosure system of the present invention.

A plurality of side diagonal braces 66 extend between the top and bottom angles between the side braces 61. A pair of end angles 70 are mounted between the top and bottom angles of truss section 44 at each end as shown in FIG. 4A. End angles 70 along with the top lateral brace 58 and bottom lateral brace 60 at the end of truss section 44, are used as mounting surfaces for connecting means such as bolts, which connect frame truss sections 44 to form frame truss 42. Risers 64 extend between top lateral braces 58 and bottom lateral braces 60 internal of side braces 61. The angles, braces and risers are fixedly mounted in relative positions by welding which gives each frame truss section 44 great load bearing capability.

In the preferred form of the present invention, loaded flight 20 and unloaded flight 22 run longitudinally through each of frame truss sections 44 as shown in FIG. 6 whereby the belt and rolls are relatively inaccessible from accidental contact by personnel standing or walking adjacent the belt. Troughing roll sets 36 are well known in the art and include three troughing rolls, a center troughing roll 72 and a pair of outboard troughing rolls 72A. In this embodiment, three rolls are used, however, one or more troughing rolls may be used successfully in other embodiments of the invention. Each troughing roll is mounted for rotation and is freewheeling on a troughing roll shaft 74. Each troughing roll shaft includes a hole at each end (not separately shown). Links 76 connect the shafts of the outboard troughing roll 72A to the center troughing roll 72 as shown in FIG. 6A. Links 76 includes a pair of holes (not separately shown) similar to the holes in the troughing roll shaft. Pins 78 extend through the holes in the troughing roll shafts and links 76, and are held in place by holding means. This mounting enables the angle between the troughing rolls to be modified according to the mounting of the outboard troughing rolls as hereinafter explained.

Figure 12:
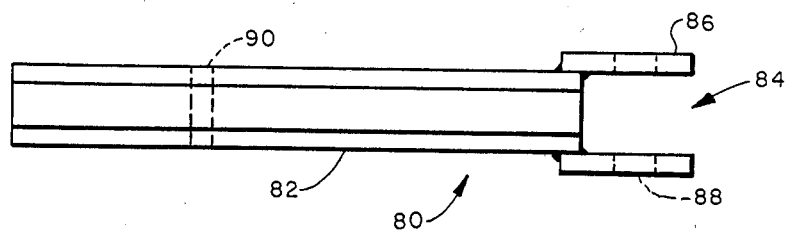
FIG. 12 is a top view of a troughing roll mounting shaft of the preferred embodiment of the present invention.
Figure 13:
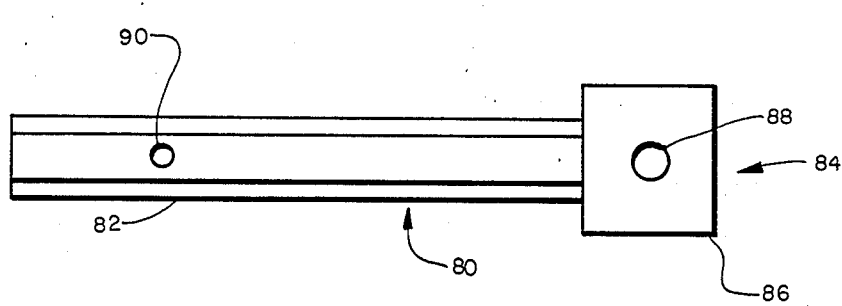
FIG. 13 is a side view of a troughing roll mounting shaft of the preferred embodiment of the present invention.
Figure 11:
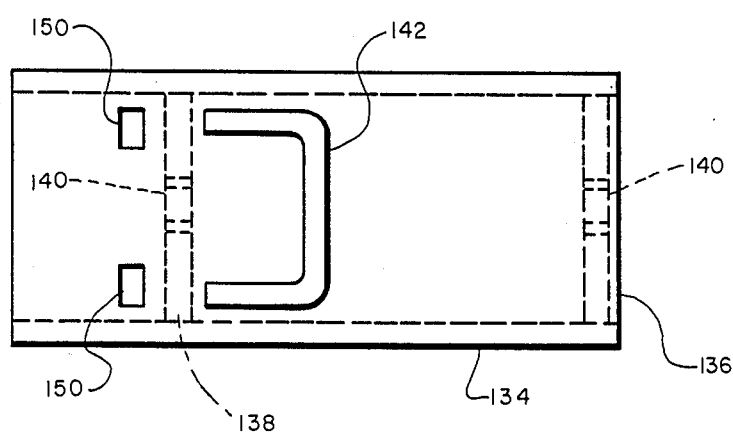
FIG. 11 is a back view of a top idler roll mounting bracket of the preferred embodiment of the present invention.

The distal portions of troughing roll shafts 74, associated with outboard troughing rolls 72A, are connected to troughing roll mounting shafts 80. As shown in FIGS. 12 and 13, shafts 80 include a hexagonal body portion 82 and a fork portion 84 comprised of a pair of plates 86 welded to hexagonal body portion 82. Plates 86 each include a hole 88. Hexagonal portion 82 includes a spring locking hole 90 the purpose of which is later discussed.

The outboard troughing roll 72A is connected to troughing roll mounting shafts 80 by pins (not separately shown) extending through the holes 88 in fork plates 86 and the holes in the distal portion of the troughing roll shaft 74 of the outboard troughing roll 72A so as to form a clevis arrangement.

Figure 14:
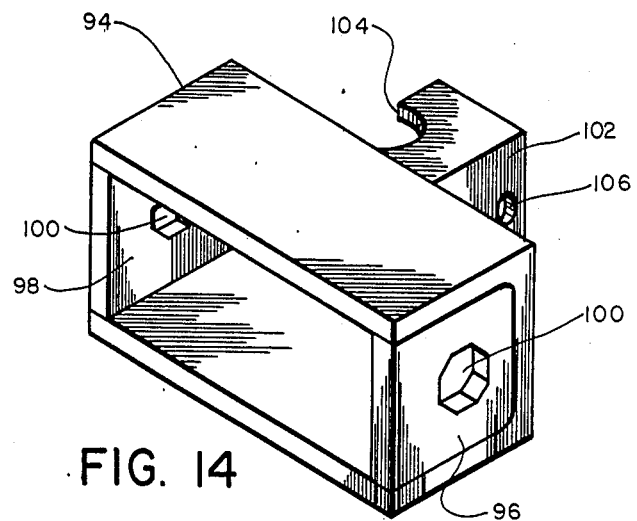
FIG. 14 is an isometric view of the body and arm portions of a troughing roll mounting bracket of the preferred embodiment of the present invention.
Figure 15:
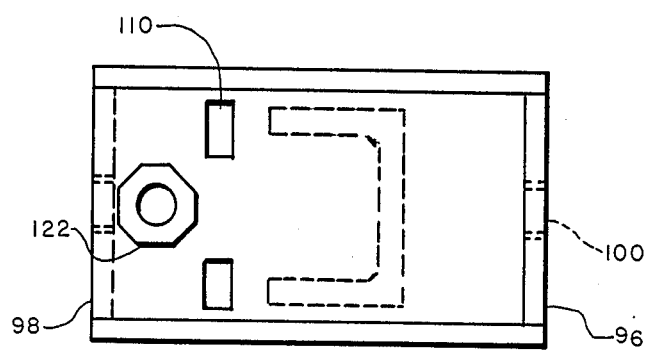
FIG. 15 is a back view of a troughing roll mounting bracket of the preferred embodiment of the present invention.
Figure 16:
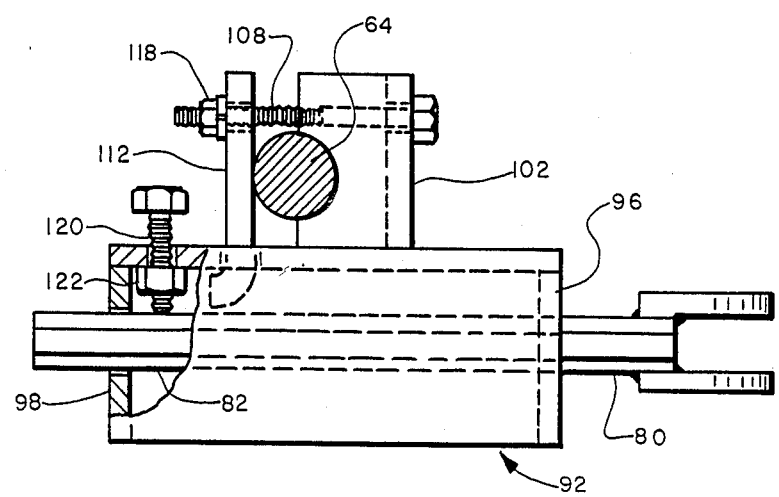
FIG. 16 is a partially sectioned view of a troughing roll mounting bracket of the preferred embodiment of the present invention.

The troughing roll mounting shafts are accepted into troughing roll mounting brackets 92. Troughing roll mounting brackets are clamped into position on risers 64 as shown in FIG. 16. Each troughing roll mounting bracket 92 has a generally rectangular C shaped body 94. A front plate 96 and a rear plate 98 are fixedly mounted on body 94 by welding. Hexagonal holes 100 in plates 96 and 98 are sized to accept hexagonal body portion 82 of troughing roll mounting shaft 80 as shown in FIG. 16. Body 94 includes a C-shaped arm 102 extending from the back thereof which is fixedly attached by welding (FIG. 14). Arm 102 includes a circular recess 104 sized to accept a first portion of a riser 64. Arm 102 also incorporates a hole 106 sized for accepting a bolt 108 as shown in FIG. 16.

Figures 10, 10A:
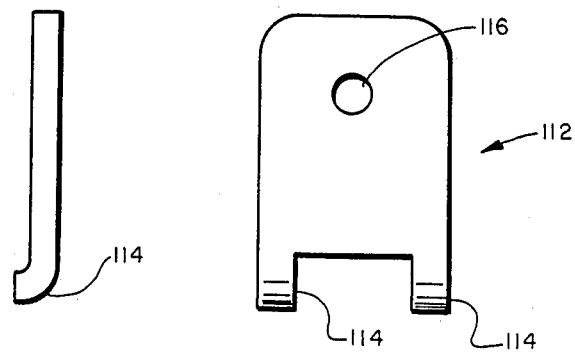
FIGS. 10 and 10A are front and side views, respectively, of a leg portion of the roll mounting brackets of the preferred embodiment of the present invention.

Body 94 also includes a pair of rectangular holes 110. Holes 110 are sized to accept a leg 112. As shown in FIGS. 10 and 10A, leg 112 includes a pair of curved fingers 114 which are sized to fit into holes 110. Leg 112 also includes a hole 116 which is sized to accept bolt 108. When assembled, body 94, leg 112 and arm 102 act as means for clamping brackets 92 to risers 64. A nut 118 on bolt 108 serves as a means for selectively engaging and disengaging the clamping means.

Figure 17:
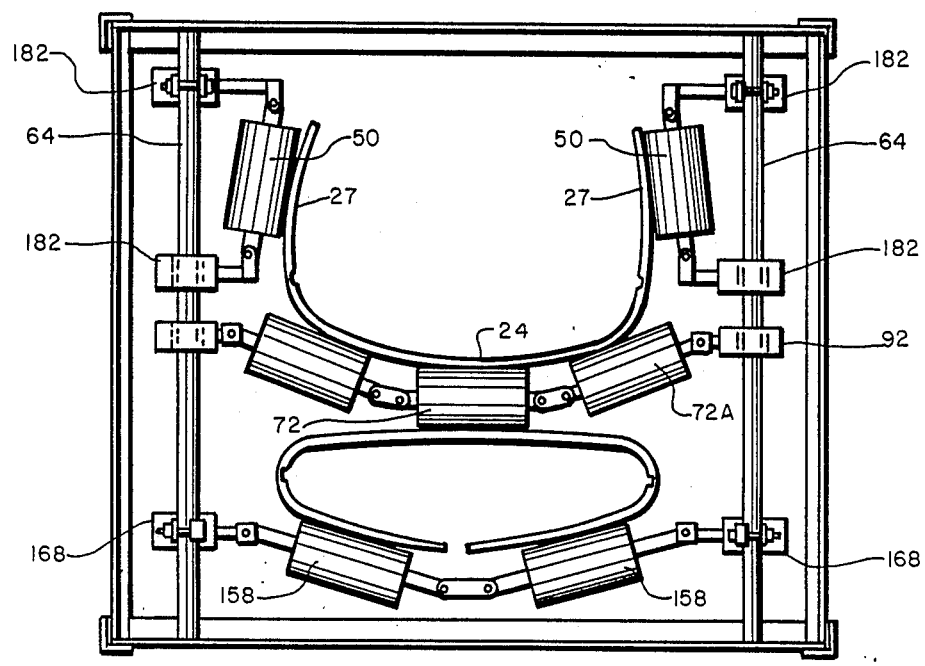
FIG. 17 is a cross sectional view of the frame truss section of the support and enclosure system of the preferred embodiment of the present invention showing the flaps of the hinged belt in the open condition.

A hole (not separately shown) extends through the back of body 94 to the posterior of rectangular holes 110. A locking bolt 120 extends though the hole and into a locking nut 122. Locking nut 122 is fixedly attached to body 94 by welding. Locking bolt 120 extends through nut 122 and into contact with body portion 82 of hexagonal shaft 80 which serves to lock said shaft into position on said bracket. By selectively disengaging locking bolt 120, shaft 80 can be adjusted transversely in plates 96, 98 and by engaging locking bolt 120 can then be locked in position. The position of shafts 80 in troughing roll mounting brackets 92 controls the alignment of troughing rolls 72 and 72A. As shown in FIG. 17, by moving shafts 80 further outward in the brackets, the trough portion 24 of the loaded flight 20 can be made shallower. The flattening of the trough portion opens flaps 27 because of the molded form of the belt. The trough portion is made shallower near the loading station 32 and unloading station 34 so that the flaps are opened and material can be deposited or removed. The construction of arm 102 and leg 112 of troughing roll mounting brackets 92 enables the bracket to be moved vertically along risers 64. This makes height adjustment of the troughing roll sets as easy as loosening and retightening nut 118. Brackets 92 can also be rotatably positioned about riser 64 which enables the ready modification of the angular position of the troughing roll sets for imparting rake angles thereto.

Also important to the invention is that troughing roll mounting shaft 80 can be rotated and held at a plurality of angles in plates 96 and 98 of bracket 92. This further facilitates the roll sets to be positioned at rake angles.

As shown in FIG. 6, top idler roll sets 38 include a pair of top idler rolls 124. In the preferred embodiment, two top idler rolls are used, however, other numbers could be successfully used in other embodiments. In the preferred form, each top idler is an outboard roll. Top idlers 124 are mounted for rotation and are freewheeling on top idler shafts 126. The top idler shafts include holes at each end and are connected at the center by a link and pin assembly 128 which is similar to that used for the troughing rolls. Top idler roll shafts 126 are connected outboard to top idler mounting shafts 130 which are similar in construction to troughing roll mounting shafts 80. Top idler mounting shafts 130 are accepted into top idler mounting brackets 132 which are clamped on risers 64.

Figure 8:
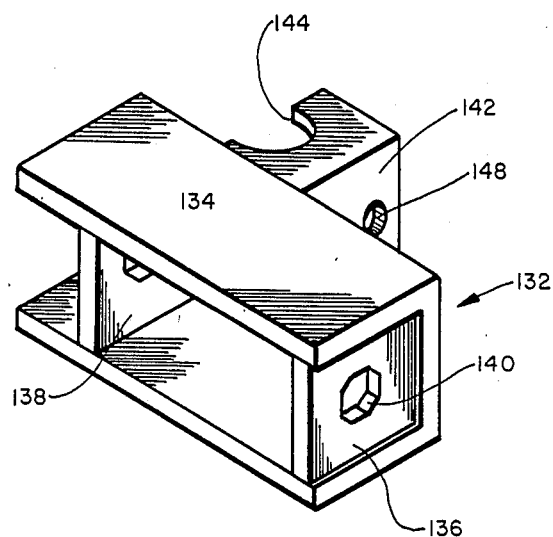
FIG. 8 is an isometric view of the body of a top idler roll mounting bracket of the preferred embodiment of the present invention.
Figure 9:
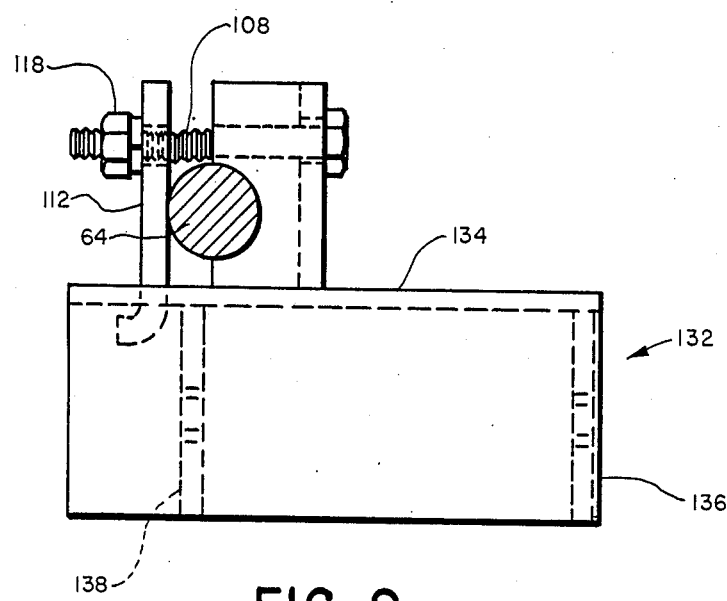
FIG. 9 is a top sectional view of a top idler roll mounting bracket of the preferred embodiment of the present invention.

As shown in FIG. 9, a top idler mounting bracket 132 includes a generally C-shaped body portion 134, a front plate 136 and a middle plate 138 which are mounted on body portion 134 by welding (FIG. 8). Plates 136 and 138 include hexagonal holes 140 for accepting a shaft 130. Body 134 incorporates a C-shaped arm portion 142 extending from the rear of the body. Arm portion 142 includes a circular recess 144 and hole 148 similar to recess 104 and hole 106 of the troughing roll mounting bracket 192. Body portion 134 also includes a pair of rectangular holes 150. Holes 150 accept curved fingers of a leg 112. A locking bolt 108 and nut 118 enables selectively clamping the top idler roll mounting brackets 132 to risers 64 as shown in FIG. 9.

Figure 7:
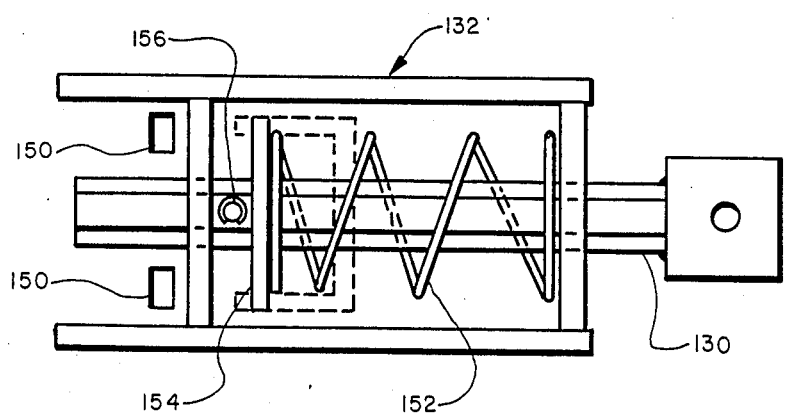
FIG. 7 is a side view of an assembled top idler roll mounting bracket of the preferred embodiment of the present invention.

Top idler roll mounting bracket 132 differ from troughing roll mounting bracket 92 in that the top idler roll mounting shafts 130 are biased outward whereas troughing roll mounting shafts 80 are locked in position. A spring 152 which serves as biasing means biases shafts 130 outward (FIG. 7). The spring is biased against a washer 154 which is held in lateral position on shaft 130 by a pin 156 which extends through the shaft. The hole in shaft 130 corresponds to hole 90 in troughing roll mounting shafts 80 which enable shafts 130 and 80 to be identical and used interchangably.

The action of spring 152 biases top idler mounting shafts 170 distally outward which results in top idler rolls 124 being biased downward against the flaps 27 of the hinged belt. This biasing action enables the belt to transport material through steep inclines and declines without flowing as the idlers hold the material in position on the belt. Further as more material is added to the belt, the top idler rolls 124 are pushed upward which movement is resisted by the biasing force of springs 152. Thus, as the loaded flight is loaded with more material and the potential for unwanted material flow becomes greater, the greater the top idler resist such flow by pushing on the belt.

Figure 17A:
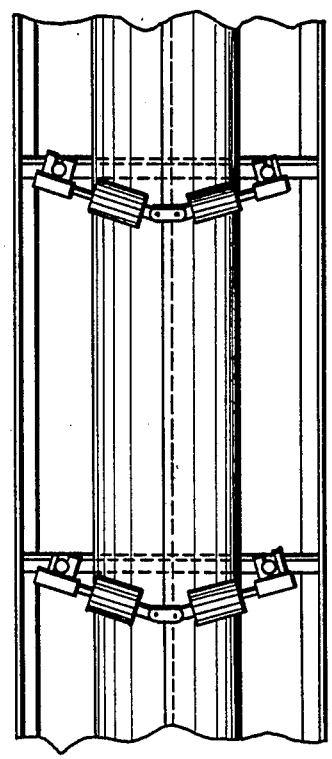
FIG. 17A is a fragmentary top view showing the mounting of the troughing rolls at a predetermined rake angle.

The force applied to the flaps is further adjustable by the vertical positioning of top idler mounting brackets 132 on risers 64. The lower that brackets 132 are positioned on said risers, the further extended shafts 130 are from the bracket for a given height of flaps 27 and the greater the biasing force. Adjusting the position of the top idler mounting brackets is accomplished by loosening the locking nuts 118 which unclamps the bracket positioning the bracket on the riser and retightening the nut when the bracket is in the desired position. Brackets 132 are also rotatably positionable on risers 64 which facilitates the use of rake angles for the top idler rolls (FIG. 17A). Other rake angles are further achieved by rotating shafts 130 in holes 130.

Figure 6B:
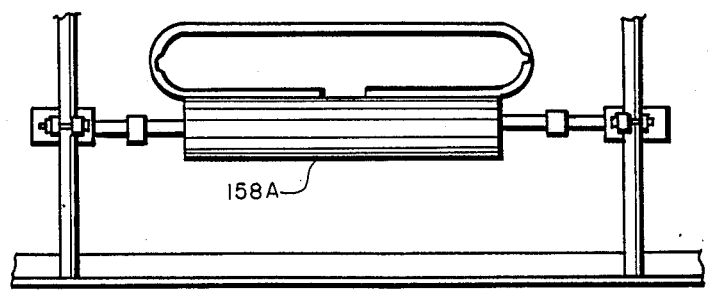
FIG. 6B is a fragmentary view of a modified form of an idler roll and belt in the return run.

Referring again to FIG. 6, unloaded flight 22 is positioned in frame truss 42 underneath loaded flight 20. The unloaded flight is inverted from the loaded flight and moves in the opposite direction. In the preferred embodiment, the unloaded flight is returned in the closed condition from the head pulley which is achieved in a manner later explained. The upper portion of the unloaded flight is in contact with the center of troughing roll 72 which urges it in the direction opposite of the loaded flight. The lower portion of the unloaded flight is supported by return idler roll sets 40 (FIG. 6) which consist of a pair of return idler rolls 158 or a single idler roll 158a (FIG. 6B). Preferably most return runs will consist of a combination of single and dual idler rolls with the dual rolls being positioned at a predetermined rake angle to maintain the ends of the flaps in close relationship to each other. Otherwise, the flaps ends will begin to separate causing damage to the hinge areas. Like the other rolls, return idler rolls 158 are mounted for rotation and are freewheeling on return idler shafts 160 which are connected at their center by a link and pin assembly 162. Return idler shafts are connected distally to return idler mounting shafts 164 which are identical to troughing roll mounting shafts 80 and top idler mounting shafts 130. Return idler mounting shafts 164 are accepted into return idler brackets 168 which in the preferred embodiment are identical to troughing roll mounting brackets 92. Return idler mounting brackets are therefore adjustable on risers 64 both vertically and rotatably for both the single and dual rolls. In addition, return idler mounting shafts 164 are rotatably adjustable in mounting brackets 168 to enable the return idlers to be mounted at rake angles.

As a result of the relationship of the support and enclosure system of the present invention, the troughing rolls, top idler rolls and return idler rolls can be selectively positioned vertically anywhere within frame truss 42. This enables the flights to be run at upward or downward angles different from that at which the truss is mounted. This enables the path of the belt to fit that of the terrain over which the belt extends and enables smooth transitions between truss sections. Further, the system of the present invention enables the position of the rolls to be changed easily in the field and provides for setting a wide range of rake angles on all of the roll sets.

Figure 20:
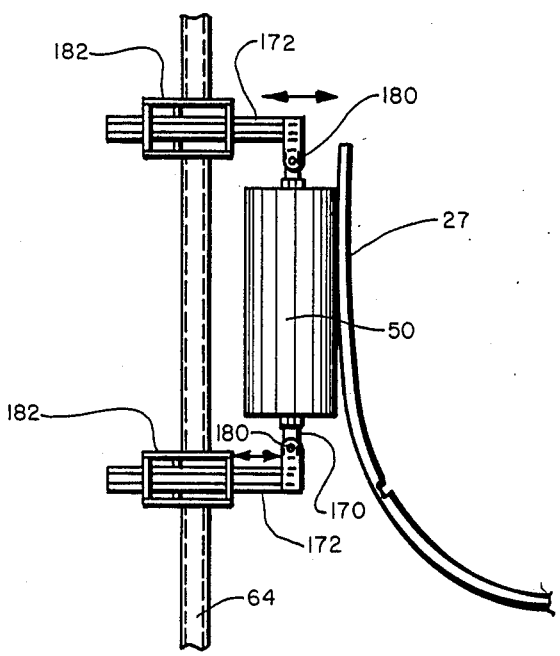
FIG. 20 is a side roll mounting assembly of the preferred embodiment.

In the areas of the loaded flight, near load station 32 and unload station 34, flaps 27 of belt 12 are opened. Opening the flaps is accomplished by flattening the angle of troughing rolls 72 and 72A by adjusting shafts 80 as shown in FIG. 17. As the trough portion 24 of the belt is flattened, the flaps 27 open in a "clam shell" fashion. In order to control the opening of the flaps, side rolls 50 may be used, and preferably will be used for closing the flaps. These side rolls are mounted on the frame truss 42 in accordance with the preferred embodiment of the invention as shown in FIG. 20. Side rolls 50 are similar to the other rolls and are mounted for rotation and are freewheeling on a side roll shaft 170. Side roll shafts 170 incorporate a hole at each end (not separately shown).

Figure 18:
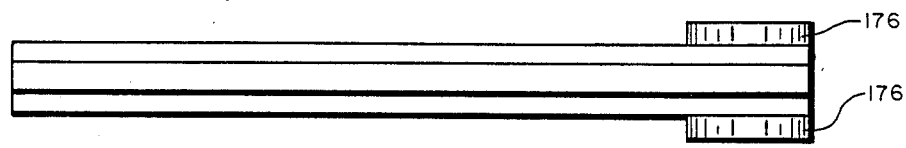
FIG. 18 is a top view of a side roll mounting shaft of the preferred embodiment.
Figure 19:
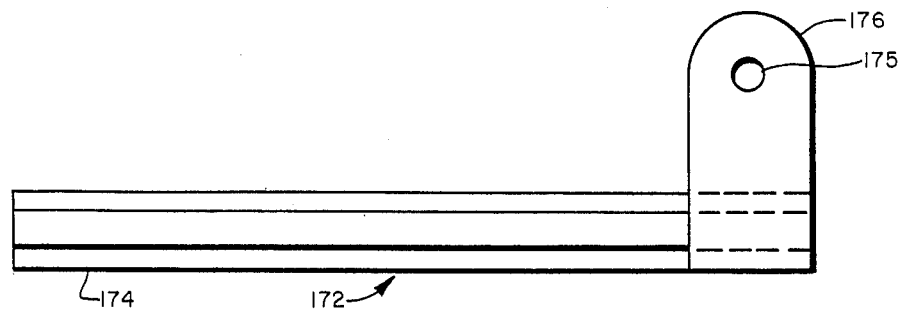
FIG. 19 is a side view of a side roll mounting shaft of the preferred embodiment.

A pair of side roll mounting shafts 172 are used for mounting each side roll. Side roll mounting shafts 172 include a hexagonal body portion 174 and a pair of vertically extending ears 176 as shown in FIGS. 18 and 19. Ears 176 incorporate holes 175. Pins 180 extend through holes 175 and the holes in sideroll shafts 170 for connecting said shafts.

The hexagonal body portion 174 of each side roll mounting shaft is sized similarly to troughing roll mounting shaft 180 and is accepted into side roll mounting brackets 182. Side roll mounting brackets 182 are identical in the preferred embodiment to troughing roll mounting brackets 92 and return idler roll mounting brackets 168. The side roll mounting brackets are selectively positioned and clamped on risers 64. This mounting enables the side rolls to be positioned vertically and rotatably at any desired location or angle relative to the truss.

Figure 21:
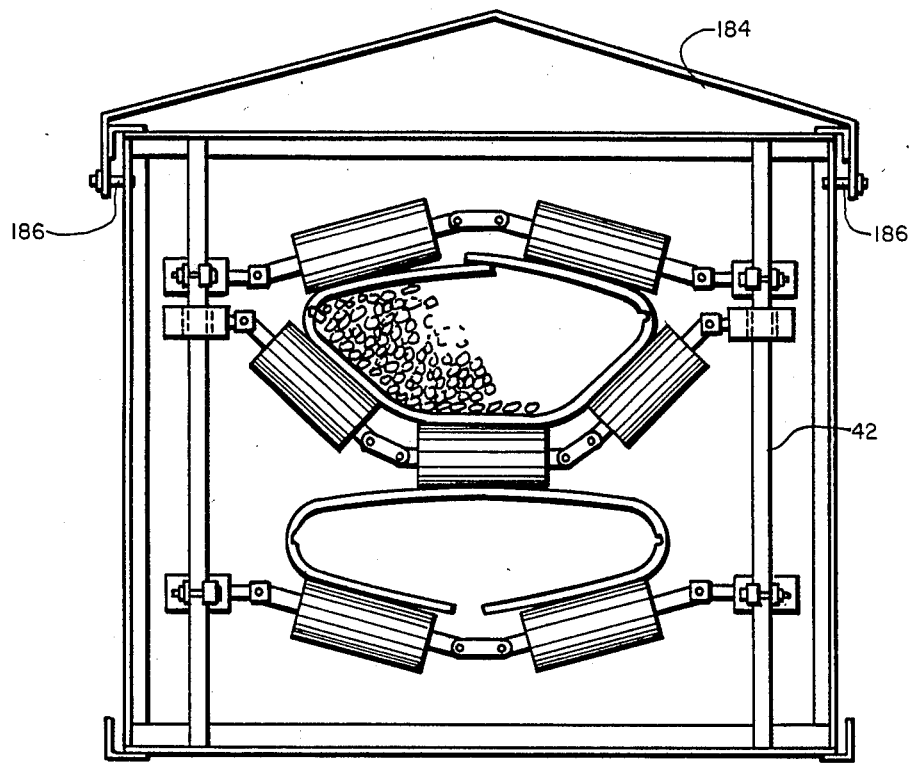
FIG. 21 is a cross sectional view of the support and enclosure system of the preferred embodiment of the present invention similar to FIG. 6 but including a cap assembly.

The rectangular construction of frame truss 42 of the preferred embodiment of the present invention provides for enclosing the belt and rollers which is not possible in prior systems. As shown in FIG. 21, frame truss 42 may be fitted with a cap 184 which extends over the truss. The cap is fixedly mounted to the truss by mounting means 186 and provides protection for the belt and the rollers from the elements in addition to the increased safety factor for the operating personnel. In other embodiments, the cap may be extended to enclose both the top and sides of the frame truss. Such enclosure provides the added safety to prevent persons from becoming caught in the conveyor belt.

Another main feature of the present invention is the use of orienting pulleys 52 and 52A closely adjacent head pulley 14 and tail pulley 16, respectively, for controlling the movement of the flaps to prevent damage thereto. Either one or both orienting pulleys are used in each belt section. Orienting pulley 52 is a flat roll which spans the width of loaded flight 20 as shown in FIGS. 3 and 3A, downstream of and closely adjacent head pulley 14. Pulley 52 is mounted on a shaft 188 which is journaled in bearing means 190. Bearing means 190 are mounted on a truss extension 192 adjacent head pulley 14. Orienting pulley 52 is positioned in advance of head roll 14, preferably between several inches to 4 feet and is positioned to move the trough portion of the loaded flight to an elevation slightly greater than the elevation of the head pulley as shown in FIG. 3A. Elevating the belt in advance of the head pulley by orienting pulley 52 prevents flaps 27 from attempting to fold under the head pulley at an area different than hinge area 26 as shown in FIG. 3B. Instead, pulley 52 relieves the pressure on flaps hinges 26 so that they assume a position such as shown in FIG. 3C. Orienting pulley 52 forces the belt flaps to full open position before head pulley 14 which prevents the attempted under folding of the flaps as shown diagrammatically in FIG. 3B. It has been discovered that crownless orienting pulleys and head pulleys provide better results than crowned pulleys or rolls. Also both pulleys apply an outward force against its respective belt flight as shown in FIG. 3A which causes the belt to begin assuming a level relationship with its respective pulley.

Orienting pulley 52A located adjacent tail pulley 16 will press downwardly on the belt as shown in FIG. 3A and preferably is located from several inches to 4 feet in advance of pulley 16 as is orienting pulley 52. This prevents flaps 27 from attempting to overlap or leave too large of a gap opening when passing over tail pulley 16 and damaging the flaps and hinges in a manner similar to that shown in FIG. 3B. Orienting pulley 52A is needed at tail pulley 16 if the belt flaps are opened or closed in the return run as shown in FIGS. 6, 17 and 20 which is the desired arrangement.

The more downward pressure exerted on the belt by orienting pulley 52A, when the belt in in the closed position, wider will be the gap between the ends of flaps 27 (FIG. 3E). If insufficient pressure is exerted the flaps will overlap which will cause to the flaps to attempt to fold at places other than directly at hinges 26. Improper flap movement also will occur if too great of pressure is exerted by orienting pulley 52A causing too large a gap between the flap ends. Preferably a gap of less than one inch is desired for most applications. Upon the belt going over the tail pulley a gap is desirable between the flap ends as shown in FIG. 3D.

The foregoing new hinged belt conveyor support and enclosure system achieves the above stated objectives, eliminates difficulties encountered in prior systems, solves problems and obtains the desirable results described herein.

In the foregoing description, certain terms have been used for brevity, clarity and understanding. However, no unnecessary limitations are to be implied therefrom because such terms are for descriptive purposes and are intended to be broadly construed. Moreover, the description and illustrations given are by way of example and the invention is not limited to the exact details shown or described.

Having described the features, discoveries and principles of the invention, the manner in which the hinged belt and enclosure system is constructed and operated and the advantages and useful results obtained, the new and useful structures, devices, elements, arrangements, parts, combinations, systems, equipment operations, and relationships are set forth in the appended claims.

What is claimed is:

1. A support and enclosure system for a continuous hinged belt conveyor, said belt having a pair of flaps, and a trough portion and including a loaded and unloaded flight extending between a head pulley and a tail pulley comprising:
   a frame enclosing said loaded belt flight, said frame including a plurality of vertical risers outwardly disposed of said flight;
   a plurality rotatable troughing rolls adjacent and in supporting contact with the trough portion of said loaded flight, said troughing rolls being arranged in a plurality of troughing roll sets, the rolls in a set extending traverse to said flight between said risers, each of said sets terminating distally of said flight in outboard troughing rolls;
   a plurality of troughing roll mounting shafts extending distally of said outward troughing rolls;
   troughing roll connecting means connecting said troughing roll mounting shafts to said outboard troughing rolls; and
   a plurality of troughing roll mounting brackets adjacent said risers, each of said brackets comprising:
   a body;
   shaft accepting means for accepting a troughing roll mounting shaft;
   locking means for locking said troughing roll mounting shaft in traverse relation on said body; and
   clamping means for holding said body to said adjacent riser, said clamping means selectively disengagable to enable said body to be selectively positioned vertically and rotatably on said riser and selectively engageable to hold said riser and body in fixed relation.

2. The support and enclosure system of claim 1 and further comprising:
   a plurality of rotatable top idler rolls adajcent and in contact with the flaps of said loaded flight, said idler rolls being arranged in a plurality of top idler roll sets, the rolls in a set extending traverse of said loaded flight between said risers, each of said sets terminating distally on each side of said loaded flight in outboard top idler rolls;
   a plurality of top idler roll mounting shafts extending distally of said outboard top idler rolls;
   top idler roll connecting means for connecting said top idler mounting shafts to said outboard top idler rolls; and
   a plurality of top idler roll mounting brackets adjacent said risers, each of said brackets comprising:
   a body;

shaft accepting means for accepting a top idler mounting shaft;

biasing means for distally biasing said top idler mounting shaft; and clamping means for holding said body to said adjacent vertical riser, said clamping means selectively disengageable to enable said body to be selectively positioned vertically and rotatably on said riser and selectively engageable to hold said body and riser in fixed relation.

3. The support and enclosure structure of claim 2 wherein said frame also encloses said unloaded flight, and further comprising:

a plurality of rotatable return idler rolls adjacent and in supporting contact with said unloaded flight, said return idler rolls arranged in a plurality of return idler sets, the rolls in said sets extending traverse of said unloaded flight between said risers, each of said sets terminating distally on each side in outboard return idler rolls;

a plurality of return idler mounting shafts extending distally of said outboard return idler rolls;

return idler roll connecting means for connecting said return idler mounting shafts to said outboard return idler rolls;

a plurality of return idler mounting brackets adjacent said risers, each of said brackets comprising:

a body;

shaft accepting means for accepting a return idler mounting shaft;

locking means for locking said shaft in traverse relation on said body; and clamping means for holding said body to said adjacent vertical riser, said clamping means selectively disengageable to enable said body to be selectively positioned vertically and rotatably on said riser and selectively engageable to hold said riser and body in fixed relation.

4. The support and enclosure structure of claim 1 and further comprising:

an orienting pulley in supporting contact with said trough portion of said loaded belt flight several inches to four feet in advance of said head pulley in the direction of travel of said loaded flight whereby said flaps of said belt are open upon travel about said head pulley.

5. The support and enclosure structure of claim 1 and further comprising a cap on said frame.

6. The support and enclosure structure of claim 1 wherein said troughing roll mounting shafts are stationary during rotation of the troughing rolls, said troughing roll connecting means is a clevis and said locking means of said troughing roll mounting bracket locks said troughing roll mounting shaft in position both rotatably and transversely, said locking means being selectively engageable and disengageable to enable positioning of said troughing shaft when said locking means is disengaged.

7. The support and enclosure structure of claim 6 wherein said locking means for locking said troughing roll mounting shaft is a bolt threaded through a nut fixably attached to said bracket, said bolt being biased against said troughing roll mounting shaft to hold it in fixed relation on said bracket.

8. The support and enclosure structure of claim 7 wherein said shaft accepting means of said troughing roll mounting bracket is a hexagonal access hole in the body of said bracket and said troughing roll mounting shaft is hexagonal and sized for acceptance in said hole.

9. The support and enclosure structure of claim 1 wherein the risers are of circular cross section and the clamping means of the troughing roll mounting bracket comprises:

an arm extending from said bracket, said arm including a recess for accepting a first portion of said riser;

a leg pivotally mounted on said body, said leg engaging a second portion of said riser generally opposed of said first portion; and arm leg biasing means biasing said leg towards said arm.

10. The support and enclosure structure of claim 9 wherein said leg and arm both incorporate access holes, and said arm leg biasing means is a bolt extending through said access holes tensioned against a nut threaded on said bolt.

11. The support and enclosure system of claim 2 wherein said top idler mounting shafts are stationary during rotation of said top idler rolls, said top idler roll connecting means is a clevis and said top idler mounting bracket further comprises top idler shaft position holding means for holding said top idler shaft in fixed rotable position, said means being selectively engageable for holding said shaft and selectively disengageable to enable rotable positioning when said holding means is disengaged.

12. The support and enclosure system of claim 11 wherein said shaft accepting means of said top idler shaft mounting bracket is a hexagonal access hole in the body of said bracket and said top idler shaft is hexagonal and sized for acceptance in said hole.

13. The support and enclosure system of claim 2 wherein said biasing means for biasing said top idler mounting shaft distally is a spring.

14. The support and enclosure system of claim 2 wherein the risers are circular in cross section and the clamping means of the top idler roll mounting bracket comprises an arm extending from said bracket, said arm including:

a recess for accepting a first portion of said riser;

a leg pivotally mounted on said body, said leg engaging a second portion of said riser generally opposed of said first portion; and arm leg biasing means biasing said leg toward said arm.

15. The support and enclosure system of claim 14 wherein said arm and leg both incorporate access holes and said arm-leg biasing means is a bolt extending through said access holes, tensioned against a nut threaded on said bolt.

16. The support and enclosure system of claim 3 wherein said return idler mounting shafts are stationary during rotation of the return idler rolls, said return idler roll connecting means is a clevis and said locking means of said return idler roll mounting bracket locks said return idler roll mounting shaft in position both rotatably and transversely, said locking means being selectively engageable and disengageable to enable positioning of said return idler roll mounting shaft when said locking means is disengaged.

17. The support and enclosure system of claim 16 wherein said locking means for locking said return idler roll mounting shaft is a bolt threaded through a nut fixedly attached to said bracket, said bolt being biased against said return idler roll mounting shaft to hold said shaft in fixed relation on said bracket.

18. The support and enclosure system of claim 17 wherein said shaft accepting means of said return idler roll mounting bracket is a hexagonal access hole in the body of said bracket and said return idler roll mounting shaft is hexagonal and sized for acceptance in said hole.

19. The support and enclosure system of claim 3 wherein the risers are of circular cross section and the clamping means of the return idler roll mounting bracket comprises:
   an arm extending from said bracket, said arm including a recess for accepting a first portion of said riser;
   a leg pivotally mounted on said body, said leg engaging a second portion of said riser generally opposed of said first portion; and
   arm-leg biasing means biasing said leg toward said arm.

20. The support and enclosure system of claim 19 wherein said leg and arm both incorporate access holes and said arm leg biasing means is a bolt extending through said access holes tensioned against a nut threaded on said bolt.

21. A support and enclosure system for a hinged belt conveyor, said belt having a pair of end flaps and a central trough portion and including a loaded and unloaded flight extending between a head pulley and a tail pulley comprising:
   a frame enclosing said loaded belt flight, said frame including a plurality of vertical risers outwardly disposed of said flight;
   support means for supporting said trough portion of said loaded flight;
   a plurality of rotatable top idler rolls adjacent and in contact with the flaps of said loaded flight, said idler rolls being arranged in a plurality of top idler roll sets, the rolls in a set extending traverse of said loaded flight between said risers, each of said sets terminating distally or each side of said loaded flight in outboard top idler rolls;
   a plurality of top idler mounting shafts extending distally of said outboard top idler rolls;
   top idler roll connecting means for connecting said top idler mounting shafts to said outboard top idler rolls;
   a plurality of top idler mounting shaft brackets adjacent said risers, each of said brackets comprising:
   a body;
   shaft accepting means;
   biasing means for distally biasing said top idler mounting shafts; and
   clamping means for holding said body to said adjacent vertical risers, said clamping means selectively disengageable to enable said body to be positioned selectively vertically and rotatably on said riser and selectively engageable to hold said body and riser in fixed relation.

22. A support and enclosure system for continuous hinged belt conveyor, said belt having flaps and a central rough portion including a loaded and an unloaded flight extending between a head pulley and a tail pulley comprising:
   a frame enclosing said unloaded belt flight, said frame including a plurality of vertical risers, outwardly disposed of said flight;
   a plurality of rotatable return idler rolls adjacent and in supporting contact with said unloaded flight, said return idler rolls arranged in a plurality of return idler rolls sets, the rolls in said sets extending traverse of said unloaded flight between said risers, each of said sets terminating distally on each side in outboard return idler rolls;
   a plurality of return idler roll mounting shafts extending distally of said outboard return idler rolls;
   return idler roll connecting means for connecting said return idler mounting shafts to said outboard return idler rolls;
   a plurality of retun idler mounting brackets adjacent said risers, each of said brackets comprising:
   a body;
   shaft accepting means for accepting a return idler mounting shaft;
   locking means for locking said shaft in traverse relation on said body;
   clamping means for holding said body to said adjacent vertical riser, said clamping means selectively disengageable to enable said body to be selectively positioned vertically and rotatably on said riser and selectively engageable to hold said body and riser in fixed relationship; and
   an orienting pulley in pressure engagement with the troughing portion of the unloaded belt flight between several inches and four feet in upstream of the tail pulley in the direction of travel of said unloaded flight sufficient to move said troughing portion downwardly so that the flaps of said belt are open upon travel about the tail pulley;

23. A conveyor system including:
   a head pulley;
   a tail pulley;
   a hinged belt having a pair of end flaps and a central troughing portion, said belt extending between said head and tail pulleys and having loaded and unloaded flights;
   drive means for driving said belt; and
   an orienting pulley in supporting contact with the troughing portion of the loaded belt flight adjacent to and in upstream of the head pulley in the direction of travel of said loaded belt flight, said orienting pulley having a length greater than the traverse width of the central troughing portion and extends transversely across path of travel of the belt and applies an upward force against said troughing portion of the loaded belt flight sufficient to move said troughing portion outwardly to an elevation at least equal to the plane of the troughing portion of the belt extending between the orienting pulley and head pulley to create a flattened belt condition between said orienting pulley and head pulley.

24. The conveyor system defined in claim 23 in which the orienting pulley is crownless.

25. The conveyor system defined in claim 23 in which the orienting pulley is freely rotatably mounted in spaced bearings.

26. The conveyor system defined in claim 23 in which a second orienting pulley is freely rotatably mounted adjacent to and in supporting contact with the troughing portion of the unloaded flight in upstream of the tail pulley in the direction of travel of said unloaded flight.

27. The conveyor system defined in claim 26 in which each of the orienting pulley is located generally between several inches and four feet of its respective pulley.

28. A conveyor system including:
   a head pulley;

a tail pulley;

a hinged belt having a pair of end flaps and a central troughing portion, said belt extending between said head and tail pulleys and having loaded and unloaded flights;

drive means for driving said belt; and an orienting pulley in contact with the troughing portion of the unloaded flight adjacent to and in upstream of the tail pulley in the direction of travel of said unloaded flight, said orienting pulley having a length greater than the transverse width of the central troughing portion and extends transversely across the path of travel of the belt and applies a downward force against said troughing portion of the unloaded belt flight sufficient to move said troughing portion downwardly to an elevation at least equal to the plane of the troughing portion of the belt extending between the orienting pulley and tail pulley to create a flattened belt condition between said orienting pulley and tail pulley.

29. The conveyor system defined in claim 28 in which the orienting pulley is crownless.

30. The conveyor system defined in claim 28 in which the orienting pulley is freely rotatably mounted in spaced bearings.

* * * * *